US012792974B1

(12) United States Patent
Attuluri et al.

(10) Patent No.: US 12,792,974 B1
(45) Date of Patent: Nov. 10, 2026

(54) REAL TIME ACCOUNT TYPE IDENTIFICATION

(71) Applicant: Amazon Technologies, Inc., Seattle, WA (US)

(72) Inventors: Dasaradh Attuluri, Redmond, WA (US); Jatin Chhikara, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 611 days.

(21) Appl. No.: 18/474,871

(22) Filed: Sep. 26, 2023

(51) Int. Cl.
*G06N 20/20* (2019.01)
*G06Q 10/083* (2024.01)

(52) U.S. Cl.
CPC ......... *G06N 20/20* (2019.01); *G06Q 10/0838* (2013.01)

(58) Field of Classification Search
CPC ........................... G06N 20/20; G06Q 10/0838
See application file for complete search history.

(56) References Cited

U.S. PATENT DOCUMENTS

| | | | | |
|---|---|---|---|---|
| 11,922,491 | B1 * | 3/2024 | Xie | G06Q 40/02 |
| 12,488,348 | B1 * | 12/2025 | Joshi | G06N 20/00 |
| 2015/0100419 | A1 * | 4/2015 | Barton | G06N 5/04 705/14.52 |
| 2018/0144256 | A1 * | 5/2018 | Saxena | G06Q 10/40 |
| 2020/0213337 | A1 * | 7/2020 | Hodgman | H04L 67/306 |
| 2022/0051125 | A1 * | 2/2022 | Ho | G06F 18/23213 |
| 2022/0188840 | A1 * | 6/2022 | Lai | G06N 3/044 |
| 2022/0292615 | A1 * | 9/2022 | Hoskins, III | G06Q 10/40 |
| 2023/0139364 | A1 * | 5/2023 | Vemulapally | G06Q 20/4016 705/35 |
| 2023/0360066 | A1 * | 11/2023 | Carmody | G06N 7/01 |
| 2025/0045073 | A1 * | 2/2025 | Ganapathy | G06F 9/451 |
| 2026/0017635 | A1 * | 1/2026 | D'Alessandro | G06Q 20/22 |
| 2026/0099760 | A1 * | 4/2026 | Basu | G06N 20/00 |

* cited by examiner

*Primary Examiner* — Asher D Kells
(74) *Attorney, Agent, or Firm* — Kilpatrick Townsend & Stockton LLP

(57) ABSTRACT

Techniques are described herein for determining whether the account type to use is the first account type or the second account type. An example method includes receiving a request associated with an item, the online session associated with an account identifier and a first account having a first account type. Generating a prediction as to whether the whether the account type to use is the first account type or second account type based at least in part on whether the item is processed differently using the first account or the second account. Determining, based on the prediction and whether the account identifier is associated with the second account having the second account type, whether to display a first template associated with the second account. Transmitting a message to display the template.

20 Claims, 12 Drawing Sheets

FIG. 6
9:41
Shoppers business
OPTIONAL
Import account details?
Skip this step
Import account details from your personal shoppers account
Payment methods
Addresses
Tax info
Continue
Skip this step
602
604
606
608
610
600

REAL TIME ACCOUNT TYPE IDENTIFICATION

BACKGROUND

An online platform computing system can receive requests for services from users around the world. In many instances, the users communicate with the computing system via various account types. The computing system can process the user's request based on the account type. In some instances, a user may have different accounts having different types. Furthermore, the computing system may process the request differently if the user communicates with the computing system via one account type rather than another account type.

DETAILED DESCRIPTION

Figure 1:
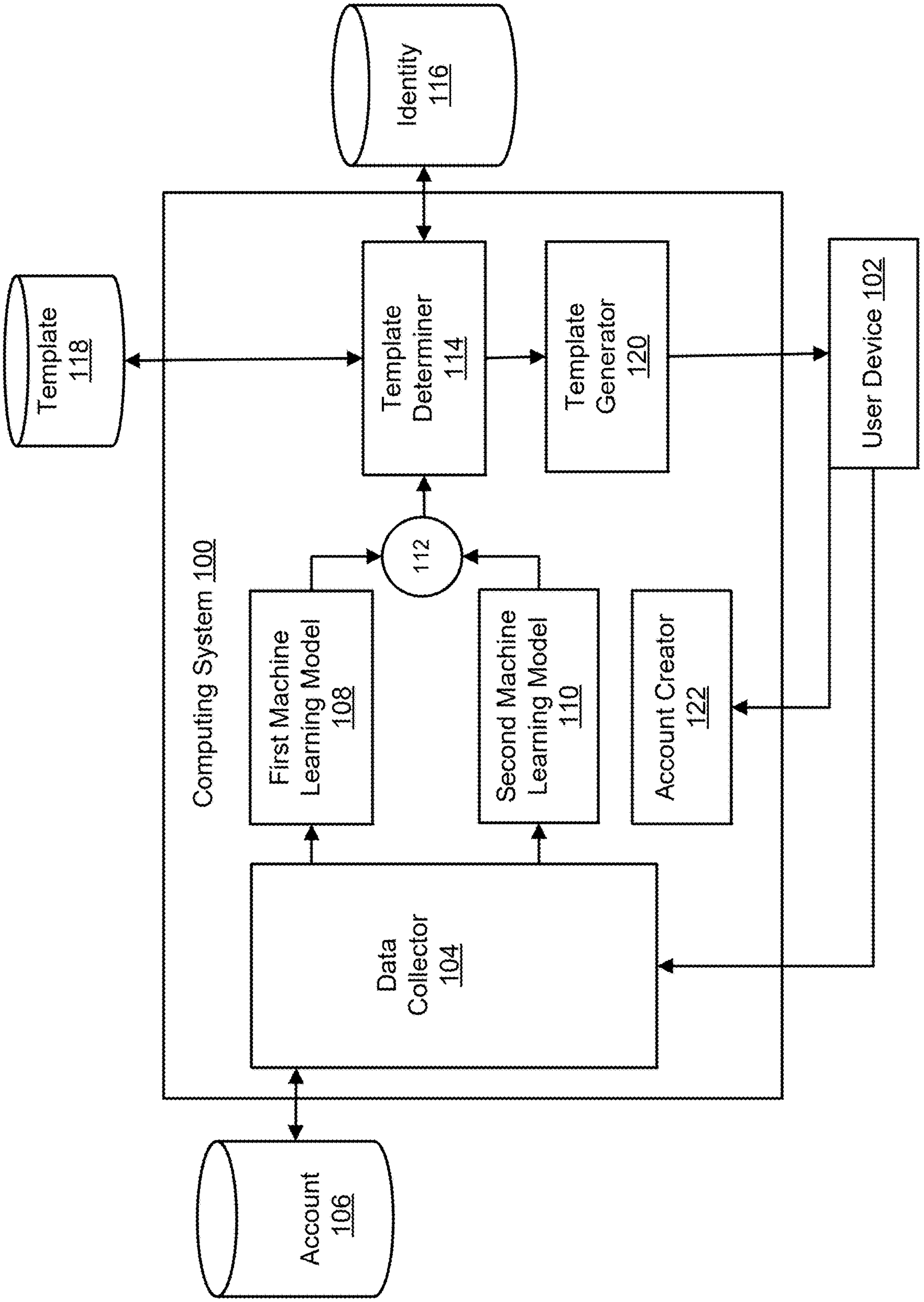
FIG. 1 illustrates an example of a system for determining whether to display content associated with an account type, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, real time user type identification. A computing system associated with determining a user type can, at the time of a current request, receive a request from a user device, where the request is based on input via a graphical user interface (GUI) to obtain information regarding an item. The request can be associated with a first account under which the device is logged in to a service that at least provides information about items. The computing system can have the capability to process and respond to the request based on a type of the first account.

The computing system can generate a first response to the request. In some instances, the request may qualify for a second account type. However, the option of transmitting the request using a second account of the second account type may not be apparent. To improve the overall experience of the service, the computing system can determine whether to display information associated with the second account. The information can include, if the second account is already set up, a prompt asking a user whether to switch to the second account. The information can also include, if the second account is not already set up, a prompt as to whether the user would like to create the second account or convert the first account into the second account.

Embodiments herein describe techniques for the computing system to determine the relevant account type to use to respond to an information request, notwithstanding such request being transmitted in association with a first account of the first account type. In response to receiving such a request for the item, the computing system can identify information provided with the request such as, a delivery address, a method of payment, and a quantity of items purchased. The computing system can also retrieve historical information associated with the first account. The historical information can include data collected from the first account over time, for example, a recent request history including an item type, a number of item requests, request frequency, and other appropriate information.

The computing system can then use the information provided along with the request and the historical information to determine whether the request is better served by using the first account type or the second account type. For example, the computing system can use a set of machine learning models to predict whether the account type to use is the first account type or the second account type based on any or a combination of the request information or the historical information. If multiple machine learning models are used, the computing system can use their outputs to generate a combined prediction, via yet another machine learning model as to determine whether the account type to use is the first account type or the second account type.

If the combined prediction indicates that the account type to use is the first account type, the computing system can continue to process the request as is. If, however, the combined prediction indicates that the account type to use is the second account type, the computing system can determine whether a second account of the second account type is already set up. For example, the computing system can access an account database and determine whether there is more than one account associated with the user. If the computing system determines that there is more than one account associated with the user, the computing system can further determine if one or more of the additional accounts is associated with the second account type.

If the computing system determines that the user has a second account having the second account type, the computing system can visually prompt, via the GUI, the user as to whether the user would rather use the second account. The computing system can further cause the GUI to display information how the computing system would process the request differently if the user used the second account. If, however, the computing system determines that the second account is not already set up, the computing system can request, via the GUI, whether the second account is to be set up. The computing system can further cause the GUI to display information how the computing system would process the request differently if the second account is used. Input via the GUI can be received and can indicate an election as to whether to continue using the first account or use the second account. The computing system can process the request accordingly.

To illustrate, consider an example, of a computing system that receives a request via a GUI. The request can be for an item displayed on the GUI. The request can include various information elements (IEs), such as an account identifier, an item description, an item quantity, an item value, a form of payment, and an item delivery address. The request can further be made using a first account associated with a first account type (e.g., an individual account type). The request may, however, be on behalf of another entity, such as a commercial enterprise. In the event that the request is on behalf of a commercial enterprise, a second account having a second account type (e.g., a commercial account type), may be used rather than an individual account type. Furthermore, the computing system may not have an express indication that the item request is on behalf of a commercial enterprise.

The computing system can parse through each IE and determine whether the IE is indicative of whether the account type to use is the first account type or the second account type. For example, the computing system can compare the addresses to addresses in a database and determine whether the address is a residential address or a commercial address. The computing system can convert the determinations into machine learning inputs. The first machine learning model can pass the inputs through a feedforward network to determine relationships between the inputs. The first machine learning model can further use the relationships to predict whether the account type to use is the first account type or the second account type.

The computing system can also make a request for historical information associated with the first account. The computing system can further make determinations as to whether the IEs from the historical information are indicative of whether the account type to use is the first account type or the second account type. The computing system can convert the determinations into machine learning inputs. The computing system can use a second machine learning to predict whether the account type to use is the first account type or the second account type. The computing system can further combine the prediction of the first machine learning model and the prediction of the second machine learning model to generate a combined prediction as to predict whether the account type to use is the first account type or the second account type. Assuming the computing system's combined prediction is to use the second account type, the computing system can then determine whether a second account associated with a second account type has been created. If the second account has been created, the computing system can cause the GUI to display a prompt asking whether the user wants to use the second account. If the computing system determines that the second account has not been created, the computing system can cause the GUI to display a request as to whether the user wants a second account. The user can then provide an input as to whether to continue with the request using the first account or to use the second account to request the item.

Embodiments of the present disclosure provide several technical advantages over conventional methods of determining account types (e.g., determining an account type by express indication). For example, the embodiments provide techniques for determining to predict whether the account type to use is the first account type or the second account type. In particular, the computing system can receive information based on a request and historical information associated with the first account, and use a set of machine learning models to predict whether the account type to use is the first account type or the second account type. Therefore, even though the request may have been made using a first account having the first account type, the computing system can use real-time and historical information to determine whether the account type to use is the first account type or the second account type. The embodiments herein further provide techniques for displaying content associated with the second account type. For example, based on the determination that the account type to use is the second account type, the computing system can cause the GUI to display information associated with the second account type. The information associated with the second account can be displayed during the same session as the session in which the request was transmitted. Furthermore, the displayed information can include interactive elements that permit the user to either switch to the second account, convert the first account to the second account, or create the second account without being redirected from the original webpage. For example, if the user has selected an item and is in a checkout stage, the information associated with the second account can be overlaid on the checkout page, such that the user can select to use a previously created second account, convert the first account to a second account, or to create a second account. Furthermore, the user is not redirected from the checkout page and therefore does not need to reselect the item after electing to make the request with the second account.

In the interest of clarity of explanation, various embodiments of the present disclosure are illustrated in connection with an individual account and a commercial account. However, the embodiments are not limited as such. For example, the embodiments equivalently apply to any account type, in which the computing system's response is based on the account type.

FIG. 1 illustrates an example of a computing system for determining whether to display content associated with an account type, according to embodiments of the present disclosure. The computing system 100 can be in operable communication with a user device 102. The computing system 100 can include one or more servers, such as webservers. The user device 102 can be a computing device (e.g., a laptop, a smartphone, a tablet) used by the user. The user device 102 can be connected to the internet and have a GUI displayed. The GUI can be associated with the entity that manages the computing system 100. The entity can be, for example, a web-based platform for obtaining goods and services. A user can view a webpage provided by the entity, whereby the webpage displays items that the user can request via the GUI. Prior to selecting the item or after selecting the item, the user can log into an account managed by the entity. The account can be a first account type, such as an individual account, and used to purchase items via the entity.

The user can make the selection via an interactive element on the GUI and the request can be transmitted to a data collector 104. In some instances, the request can include an indication to purchase the item. The request can include multiple IEs including an account identifier, an account type, delivery information, payment information, item identifier, item quantity, and other appropriate information. In response to the receiving the information from the user device 102, the data collector 104 can derive additional information from the IEs received from the user device 102 and collected historical information. For example, the data collector 104 can identify a delivery address from the IEs. The data collector 104 can further access a location database and compare the delivery address to known residential address and known commercial addresses. The data collector 104 can further determine whether the delivery address is a residential address or a commercial address. Based on the determination, the data collector 104 can generate a machine learning model input. For example, the input can be a binary input, such as a logical 0 for a residential address and a logical 1 for a commercial address. The computing system can also determine whether the financial information corresponds to an individual account or a commercial account. For example, the data collector 104 can identify the name associated with the method of payment and determine whether the name is an individual's name or a commercial enterprise. The data collector 104 can also identify the bank identification number (BIN) and determine, for example, the name of the issuing bank, the card brand (e.g., Mastercard, Visa, American Express), and the card level (e.g., Black, Platinum, Business). The data collector 104 can use this information to determine whether the payment information is indicative of an individual payment account or a commercial payment account. Based on the determination, the data collector 104 can generate a machine learning model input. For example, the input can be a binary input, such as a logical 0 for an individual payment account and a logical 1 for a commercial payment account. The data collector 104 can also use other IEs from the request. For example, does the requested delivery time correspond to business hours, does a telephone number associated with the account correspond to a business telephone number, and does an email address associated with the first account correspond to an individual email account or a commercial email account? The data collector 104 can convert each of these determinations into a machine learning input, such as a binary input. In some localities, users use an instance payment system (e.g., a unified payments interface (UPI)) to facilitate transaction. In these localities, the data collector 104 can use the information received to view the instant payment system to determine whether the payment is from an individual or a commercial enterprise.

The data collector 104 can further use the account identifier received via the request to retrieve an account history from an account database 106. Each time that the first account is used to interact with the GUI, the interactions can be logged and stored in the account database 106. The data collector 104 can use the account identifier to access account related information from the account database 106. The data collector 104 can use the information in the account history to determine whether the account type to use is the first account type or the second account type.

For example, the data collector 104 can use the information to determine whether the first account has been used downloaded invoices more than a threshold number of items. If, the account has been used to download the invoice less than the threshold number of times, the data collector 104 can determine an indication that the account type to use is the first account type. If, however, the account has been used to download invoices greater than a threshold number of times, the data collector can determine an indication that the account type to use is the second account type. The data collector 104 can convert this determination into a machine learning input.

The data collector 104 can further analyze the keywords in the account's search history to determine whether the key words indicate whether the account type to use is the first account type or the second account type. For example, the data collector 104 can identify keywords in the history of search queries the user has entered (e.g., "commercial grade equipment," "bulk purchase," or "taxable"). The data collector 104 can further use a mapping of keywords to account type to determine whether the account type to use is the first account type or the second account type. The determination can be based on comparison to a threshold number or percentage of keywords. For example, if the comparison indicates that the search is for a second account type, then the data collector 104 can determine that there is an indication that the account type to use is the second account type. If the comparison indicates that this search is for a first account type, then the data collector 104 can determine that there is an indication that the account type to use is the first account type. The data collector 104 can convert this determination into a machine learning input.

The data collector 104 can further analyze the account's request history over a time interval to determine whether the account type to use is the first account type or the second account type. In particular, the data collector 104 can determine whether the behavior corresponds to a first account type or a second account type. For example, the data collector 104 can compare the number of requests to a threshold number of requests. If the account type is a first account type, then it can be expected that the number of requests would be below the threshold. If, however, the account type is a second account type, it can be expected that the number of requests can be expected to be greater than the threshold. The data collector 104 can use the comparison to determine whether the number of requests over the time interval indicate whether the account type to use is the first account type or the second account type. The data collector 104 can convert this determination into a machine learning input.

The data collector 104 can further analyze the account's request history based on item types to determine whether the account type to use is the first account type or the second account type. Certain items can be associated with items purchased using a first account type, and other items can be associated with items purchased using a second account type. For example, gift cards are routinely purchased using first account types in small quantities. However, gift cards purchased in bulk quantities can be indicative of purchases associated with second account types. Therefore, the data collector 104 can compare the number of gift cards purchased to a threshold number of gift cards purchased. The data collector 104 can use the comparison to determine whether the number of gift cards purchased over the time interval indicates whether the account type to use is the first account type or the second account type. The data collector 104 can convert this determination into a machine learning input.

The data collector 104 can further analyze the user's request history based on the number of delivery addresses to determine whether the account type to use is the first account type or the second account type. The data collector 104 can determine the number of delivery addresses provided over a period of time. The data collector can further compare the number of delivery addresses to a threshold number of delivery addresses. The data collector 104 can use the comparison to determine whether the number of delivery addresses is indicative of a first account type or a second account type. Using the threshold permits the data collector to make the determination regardless of whether the delivery addresses are residential addresses or commercial addresses. The data collector 104 can convert this determination into a machine learning input.

The data collector 104 can further analyze the user's request history based on delivery addresses during a single session to determine whether the account type to use is the first account type or the second account type. For example, the data collector 104 can determine whether the user has made the request a large quantity of the same item in the same session, and had the items delivered to multiple delivery addresses. The data collector 104 can further compare the number of delivery addresses to a threshold number of delivery addresses. The data collector 104 can use the comparison to determine whether the number of delivery addresses indicate whether the account type to use is the first account type or the second account type. Using the threshold permits the data collector to make the determination regardless of whether the delivery addresses are residential addresses or commercial addresses, as the act of delivering to a large number of properties is indicative of a commercial use. The data collector 104 can convert this determination into a machine learning input.

As described above, the data collector 104 can use, for example, document-based information, temporal-based information, transaction-based information, item-based information, query-based information, location-based information to determine information that is indicative of whether the account type to use is the first account type or the second account type.

The data collector 104 can further transmit the inputs generated from the selection-based information to a first machine learning model 108. The first machine learning model 108 can be a model that can be implemented by a neural network (e.g., a convolution neural network (CNN), artificial neural network (ANN), or recurrent neural network (RNN)) that is trained to use the input to predict whether the account type to use is the first account type or the second account type. The first machine learning model 108 can pass the inputs through a feedforward network and determine relationships between the inputs. The first machine learning model 108 can further use the relationships to predict whether the account type to use is the first account type or the second account type.

The first machine learning model 108 can be trained using a set of inputs (e.g., request instances) and predict whether the account type to use is the first account type or the second account type. The accuracy of the first machine learning model can be tested using a loss function against a testing set of data (e.g., ground truth data). The weights of the first machine learning model 108 can be iteratively adjusted until the first machine learning model 108 performs to a threshold accuracy.

The data collector 104 can further transmit the inputs generated from the account history to a second machine learning model 110. The second machine learning model 110 can also be a model that can be implemented by a neural network (e.g., a CNN, ANN, or RNN) that is trained to use the input to predict whether the account type to use is the first account type or the second account type. The second machine learning model 110 can be trained on different training data (historical information instances) than the first machine learning model 108 as the input are different and the relationships between the inputs can be different. The second machine learning model 110 can further use the relationships to predict whether the account type to use is the first account type or the second account type.

The predictions of the first machine learning model 108 and the second machine learning model 110 can be combined to generate a combined prediction. For example, the first machine learning model 108 and the second machine learning model 110 can be part of an ensemble model. The ensemble model can use various techniques to combine the outputs of the two models. For example, the ensemble model can generate the combined prediction using a third machine learning model 112.

The computing system 100 can transmit the combined prediction to a template determiner 114. The template determiner 114 can receive the combined prediction and determine a template. For example, the combined prediction can be that the account type to use is the first account type (e.g., an individual type). Alternatively, the combined prediction can be that the account type to use is the second account type (e.g., commercial enterprise type). As indicated above, the user can make the request via a first account associated with the first account type. Therefore, if the combined prediction is that the account type to use is the first account type, the computing system 100 can process the request using the first account.

If, however, the combined prediction is that the account type to use is the second account type (e.g., a commercial type), the template determiner 114 can determine whether the user has a second account associated with a second account type (e.g., a commercial account). For example, the computing system 100 can make an application programming interface (API) call to a clustering service (e.g., identity service) that tracks accounts. The clustering service can include an identity database 116 that includes information for accounts associated with a same identifier. The clustering service can lookup the identity database 116 and determine whether the first account is valid (e.g., not a malicious account) and associated with a second account. If the first account is valid and associated with a second account, the clustering service can further determine whether any of the accounts are associated with a second account type. The clustering service can transmit an API response back to the computing system 100, and in particular the template determiner 114.

The template determiner 114 can determine one or more templates to access from a template database 118 based on the account type to use and whether the second account has been created. For example, if the user has a second account associated with a second account type, the template determiner 114 can select a template for prompting the user to make the request using the second account. If, however, the user does not have a second account, the template determiner 114 can access a template that prompts the user to create a second account. If the account type to use is the first account type, the template determiner 114 can determine to not access the template database 118.

The selected template can be transmitted to the template generator 120. The template generator 120 can access account information and auto-populate the template. For example, the template can include a greeting with the user's name (e.g., "Hi User Name,") with a prompt asking whether the user wants to open a second account.

The template generator 120 can cause the template to be displayed on the GUI at the user device 102. The user can interact with the template using one more interactive elements of the template. The computing system 100 can process the request based on the user's interaction. For example, the user can choose to continue with the request using the first account, the user can elect to switch to a second account, the user can elect to convert the first account to a second account, or the user can elect to open a second account. In the event that the user elects to convert the first account into a second account or create a second account, the account creator 122 can perform the requisite operations.

Figure 2:
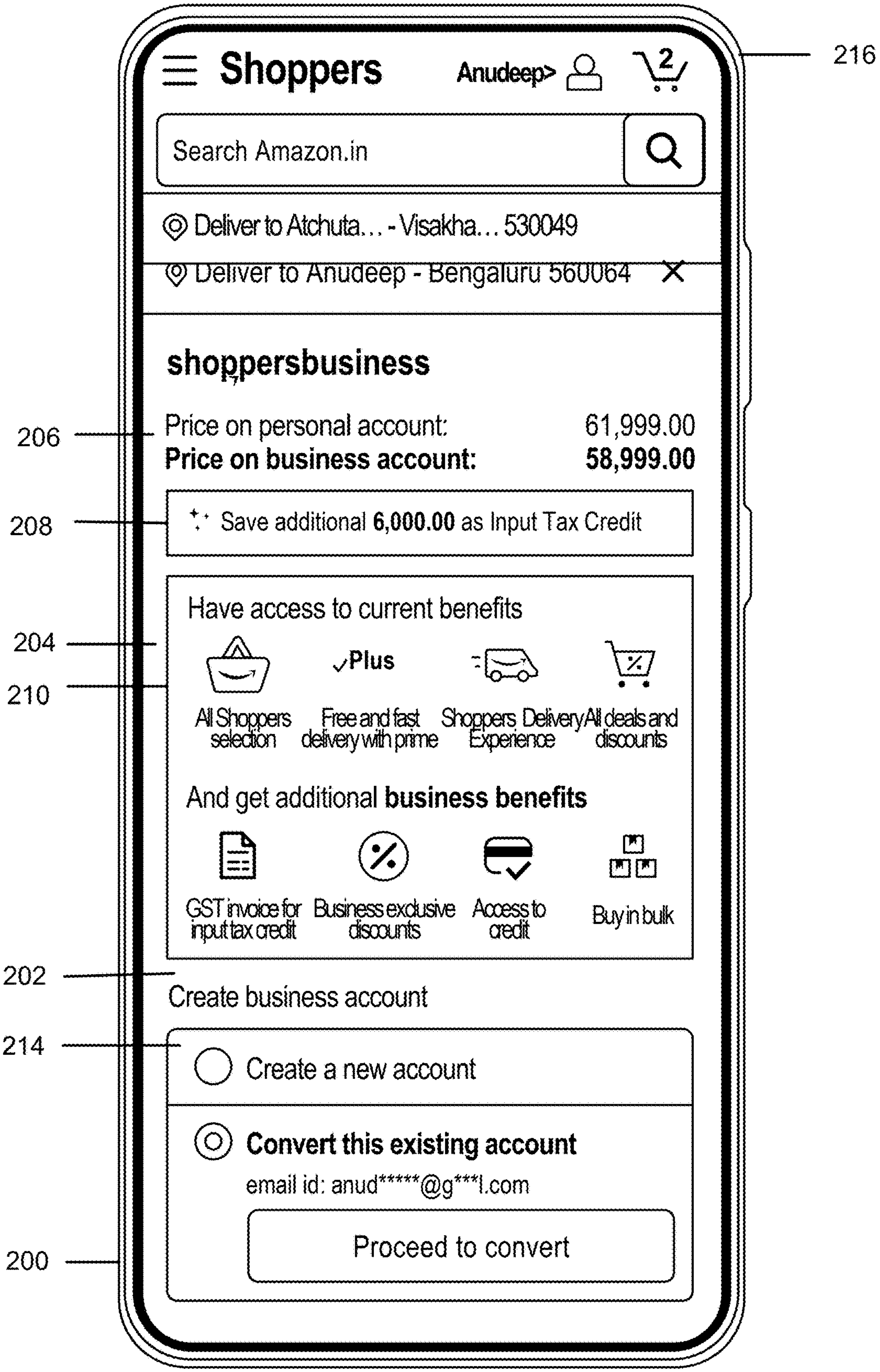
FIG. 2 illustrates an example template for generating or converting to a second account, according to embodiments of the present disclosure.

FIGS. 2-6 illustrate templates that can be displayed on a user device, and will be used to describe different paths that can be followed by the template determiner (e.g., template determiner 114). FIGS. 2-6 further describe actions in response to the different paths. FIG. 2 illustrates an example template for generating or converting to a second account, according to embodiments of the present disclosure. As indicated above, in some instances, the combined prediction of a first machine learning model (e.g., first machine learning model 108) and a second machine learning model (e.g., second machine learning model 110) can be that the account to use is the second account type. Furthermore, based on information included in an identity database (e.g., identity database 116), the template determiner can determine that the second account has not been created.

A user device (e.g., user device 102) 200 can display a GUI 202. The GUI 202 can display a template 204 selected by the template determiner. The template 204 can be configured to prompt the user to convert a first account into a second account associated with a second account type. The template 204 can include various information elements IEs providing information for the second account type. For example, the template 204 can include a price comparison 206 for the requested item. The template 204 can further include information that may be relevant for a second account type, but not necessarily a first account type. For example, a particular tax credit 208 may be relevant for the second account type (e.g., a commercial account), but not necessarily for the first account type (e.g., an individual account). The template 204 can further include information related to a comparison of current benefits with the first account and potential benefits of the second account. For example, the template 204 can include a set of benefits 210 that includes benefits associated with the first account and benefits associated with the second account.

The template 204 can include a prompt 214 for either creating a second account or converting the first account into the second account. The prompt 214 can include an interactive element for option. As illustrated, the prompt 214 include a circle for creating the second account and a circle for converting the first account into the second account. The option to convert the first account into the second account includes an email address associated with the first account as an identifier.

It should be appreciated that the user is not forced to navigate away from the underlying webpage in which the request was made. As illustrated, the digital cart 216 still includes two requested items. In instances, the template 204 can be a bottom up sheet (e.g., a standard bottom up sheet, a modal bottom up sheet, or an expanding bottom up sheet). The bottom up sheet can be a supplementary surface overlaid on the webpage that the user can interact with.

In some instances, the user can interact with the underlying webpage without exiting from the bottom up sheet, and in other instances, the user may need to exit from the bottom up sheet to interact with the underlying webpage may be a checkout page that provides a summary of the user's information, delivery information, and check out information. The user can, for example, click on a "place your order" button verifying the information and finalizing the request. In another example, the user can click on a "view requests" or "view cart" button to continue with the request. The user can be directed toward a summary of the requests, payment information, and delivery requests. In some embodiments, using an interactive element to continue or finalize the request can trigger the computing system (e.g., the computing system 100) to determine whether the account type to use is the first account type or second account type. The computing system can then cause the template 204 to be displayed via the user device.

Figure 3:
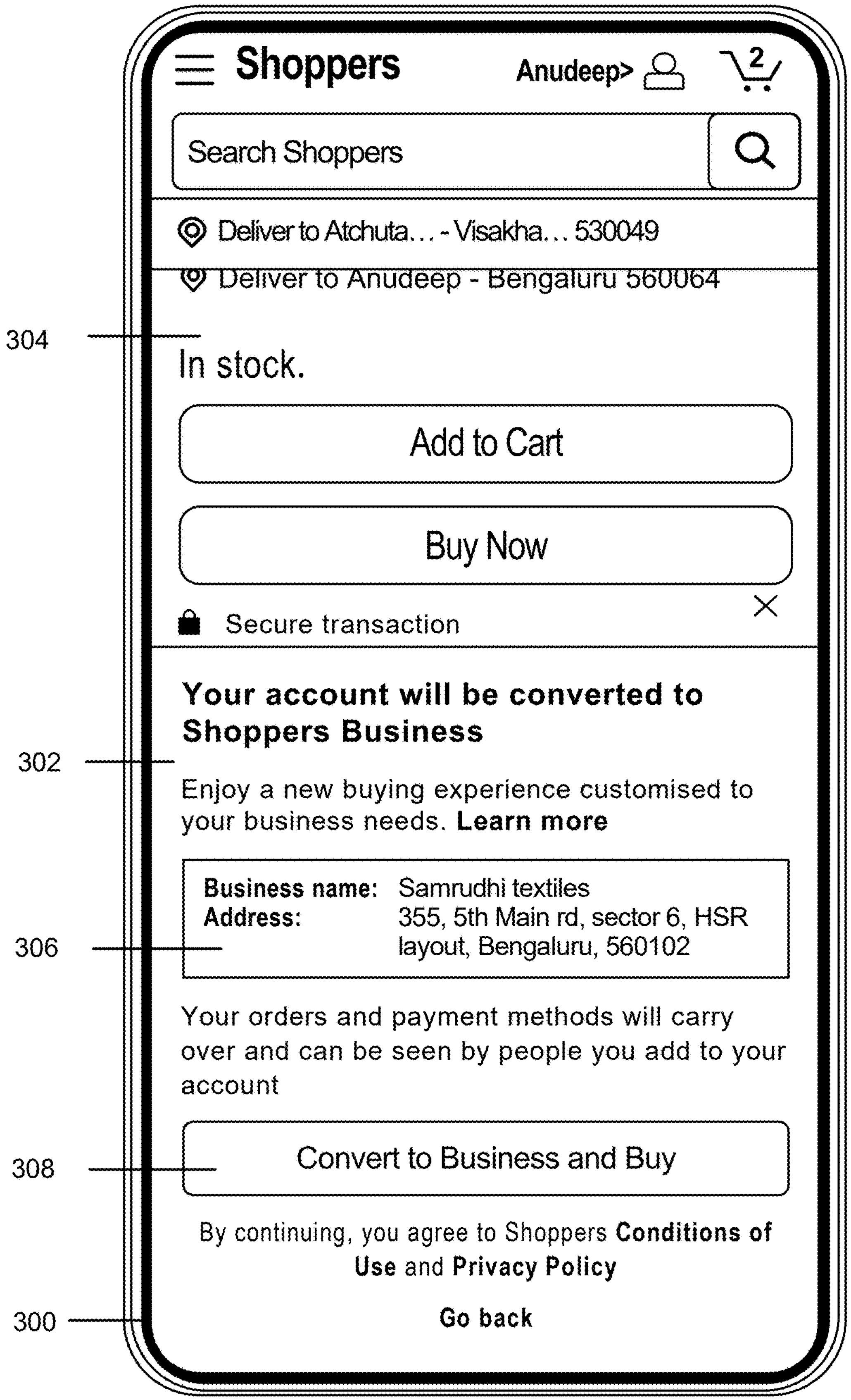
FIG. 3 illustrates an example template for converting to a second account, according to embodiments of the present disclosure.

FIG. 3 illustrates an example template for generating or converting to a second account, according to embodiments of the present disclosure. In some embodiments, a user device 300 can display a template 302 in response to clicking on the "proceed to convert" button of FIG. 2. As illustrated, the template 302 is a bottom up sheet and the underlying page 304 is visible, and the user can still interact with the interactive elements (e.g., the "Add to Cart" and "Buy Now"). The template 302 can include user identification information 306, such as a name and address. The template 302 can further include a conversion and finalize request button 308. It should be noted that the conversion and finalize request button 308 can replace the "buy now" button of the underlying page 304. In other words, at the stage of the request process that the user has reached the underlying page 304, the computing system (e.g., computing system 100) can have associated the user's information, the requested item, requested item parameters, with the delivery information. The user can of course, elect not to convert the first account into a second account. For example, the user can interact with the "Buy Now" button on the underlying page 304. If the user elects to finalize the request using the first account, the computing system can process the request under the original parameters. For example, referring back to FIG. 2, the original parameters include a price of 61,999.00, no Input Tax credit, and no invoice for input tax credit.

In response to the user clicking the "Buy Now" button of the underlying page 304, the computing system can process the request without further interaction with the user. Similarly, if the user interacts with the conversion and finalize request button 308, the computing system and in particular an account creator (e.g., account creator 122) can create a second account for the user. The account creator can collect information to be associated with the account, for example, from an account database (e.g., account database 106). This information can include a password, if the password is to be transferred from the first account to the second account. The account creator can further validate the information (e.g., is the email address a valid email address, is the username being used by another entity, and other appropriate validations). The account creator can further associate the validated information with a database of second accounts associated with the second account type. Once the account has been created, the computing system can process the request under the second account parameters. For example, referring back to FIG. 2, the second account parameters include a price of 59,999.00, an Input Tax credit if the user elects to claim the credit, and an invoice for the input tax credit. The next time that the user logs in to the website, the user can use the second account to log in. It should be appreciated that, in some instances, conversion from the first account to the second account does not include the loss of the first account, and presumably the user can still use the first account. Rather conversion from the first account to the second account can include using information from the first account to create.

Figure 4:
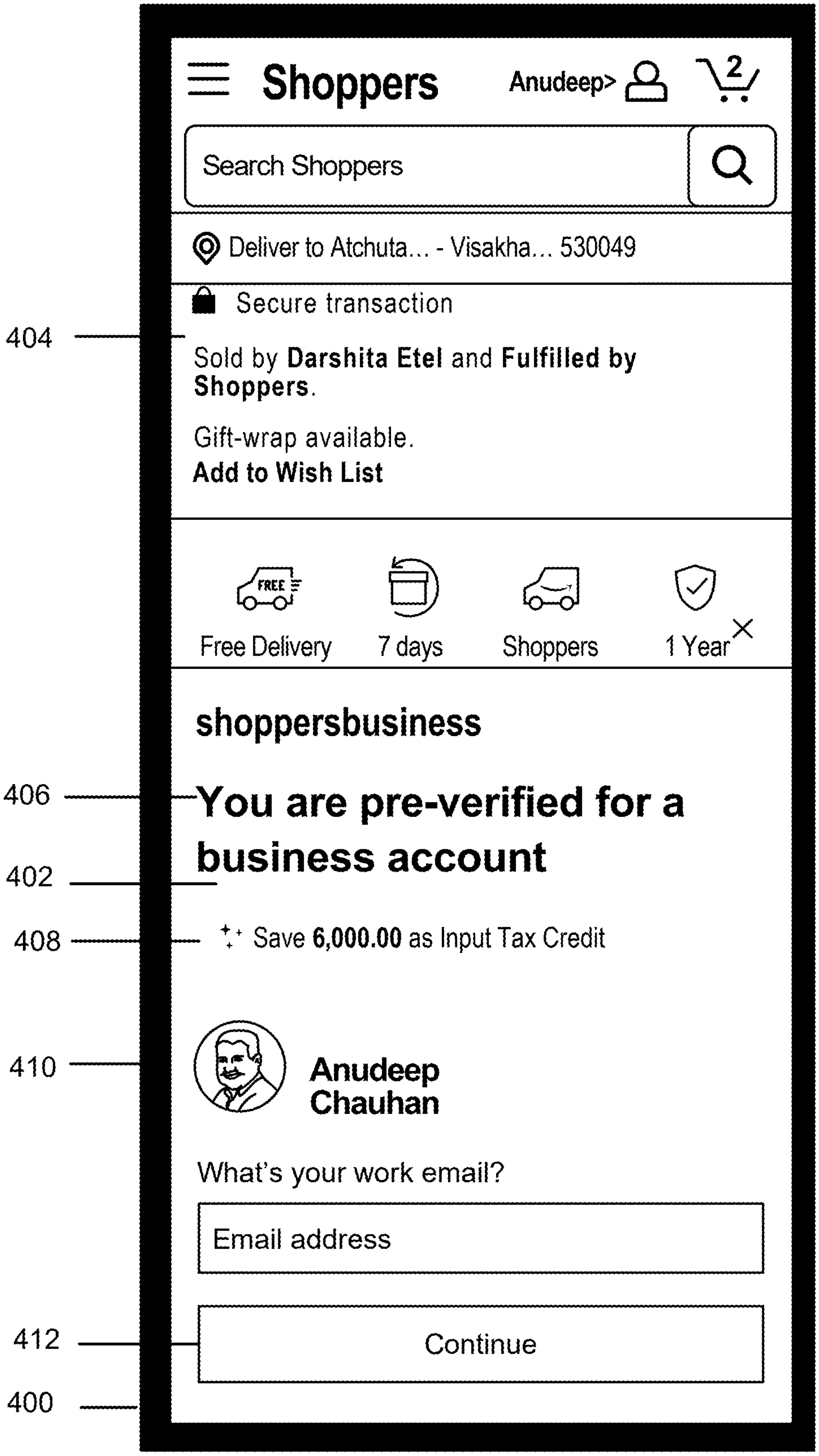
FIG. 4 illustrates an example template for notifying an availability of a second account, according to embodiments of the present disclosure.

FIG. 4 illustrates an example template for notifying an availability of a second account, according to embodiments of the present disclosure. In some embodiments, a user device 400 can display a template 402 in response to selecting an item on a webpage that includes a plurality of items. The template 402 can be displayed over (e.g., a bottom up sheet) an underlying informational page 404 for the item. For example, the user can view a webpage displaying a plurality, while logged into a first account. The user can select one of the items and be directed to an informational page 404 for the item. The user can further indicate an intent to purchase the item. For example, the user can click on a "Add to Cart" button, and further select the Cart button to view selected items. Once in the cart view, the user can click another button that directs the user to a final page before finalizing the transaction. For example, the user can click on a "proceed to checkout" button. Based on the selection of the button to proceed to the final page, the computing system (e.g., the computing system 100) can be triggered to determine whether the user is transmitting a request for the user or for another entity. If the computing system determines that the user is transmitting the request for another entity, the computing system can cause the template 402 to be overlaid on the informational page 404. The template 402 can include a notification 406 that the user is eligible to create a second account associated with a second account type. The template 402 can further include an indication of benefits 408 for purchasing the selected item using the second account. The template can further include a user identifier 410 to indicate that the user is the intended recipient of the template 402. The template 402 can further include an interactive element 412 for proceeding with creating a second account.

Figure 5:
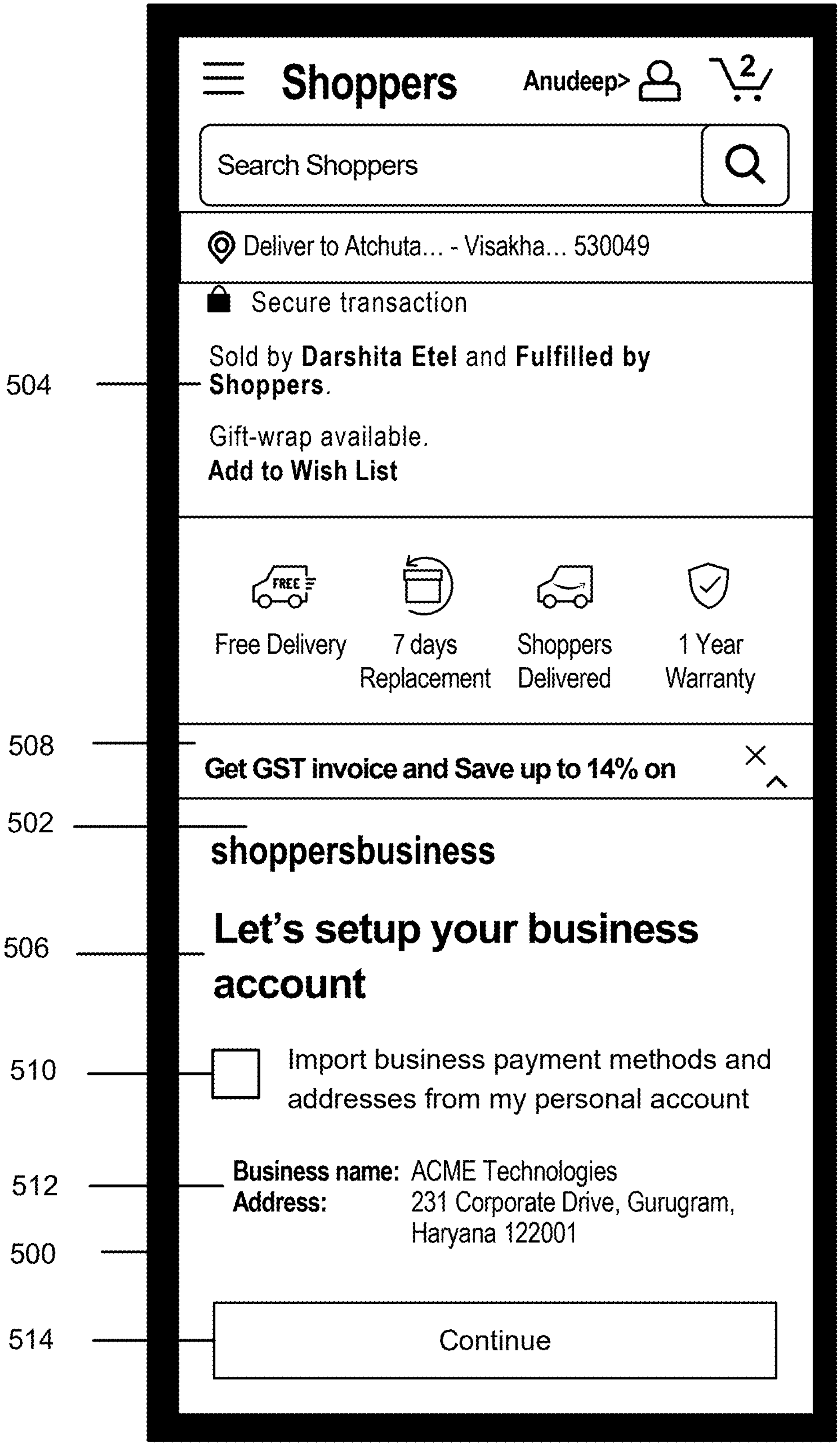
FIG. 5 illustrates an example template for notifying an availability of a second account, according to embodiments of the present disclosure.

FIG. 5 illustrates an example template for notifying an availability of a second account, according to embodiments of the present disclosure. Based on the selection of the button to proceed to the final page, the computing system (e.g., the computing system 100) can be triggered to determine whether the user is transmitting a request for the user or for another entity. If the computing system determines that the user is transmitting the request for another entity, the computing system can cause the template 502 to be overlaid on the informational page 504. The template 502 can include a notification 506 to create a second account associated with a second account type. The template 502 can further include an indication of benefits 508 for creating the second account. One issue for creating second accounts is that even if the user derives a benefit from creating the second account, user data entry fatigue leads users to not create a second account. Therefore, the template 502 can further include a first interactive element 510 to import user information to the second account. The template 502 can further include a candidate second account identifier(s) 512, such as name and second account address. The candidate second account identifiers can be information obtained during the process of determining whether the account type to use is the first account type or second account type. For example, the candidate second account name can be a name associated with a delivery address or financial information. The candidate address can be the delivery address or an address associated with the financial information. In some instances, the candidate second account name and candidate address are the name and address used for the first account. In any event, the information stored for the first account, for example in the account database 106, can be imported to the second account. The template 502 can further include a second interactive element 514 to proceed with creating the second account. The user can click on the second interactive element 514 and proceed to a next step for creating the second account.

Figure 6:
FIG. 6 illustrates an example template for importing information from a first account to a second account, according to embodiments of the present disclosure.

FIG. 6 illustrates an example template for importing information from a first account to a second account, according to embodiments of the present disclosure. In some instances, a user may wish to select which information elements from the first account are to be imported into the second account. In some embodiments, a user device 600 can display a template 602 in response to the user clicking on an interactive element (e.g., the second interactive element of FIG. 5). The template 602 can include one or more interactive elements to assist the user to select which interactive elements to import from the first account to the second account. As illustrated, a first interactive element 604 can be a general indication to import information from the first account. The template 602 can further include additional interactive elements for selecting classes of information to import from the first account to the second account. A second information element 606 can be for importing financial information from the first account to the second account. A third interactive element 608 can be for importing address information from the first account to the second account. A fourth interactive element 610 can be for importing tax information from the first account to the second account.

The user's selections can be received by an account creator (e.g., account creator 122). The account creator can access an account database (e.g., account database 106) and retrieve information associated with the user's first account based on the selections. For example, a user may only wish to import financial information and tax information from the first account as the user plans on inputting different delivery information. The account creator can create the second account using the information imported from the first account. The account creator can further cause a request for information to be displayed on the user's device (e.g., user device 102) requesting any missing information. Upon receipt of the missing information, the account creator can create the second account. Upon creation of the second account, the computing system can process the request for the user using the second account.

Figure 7:
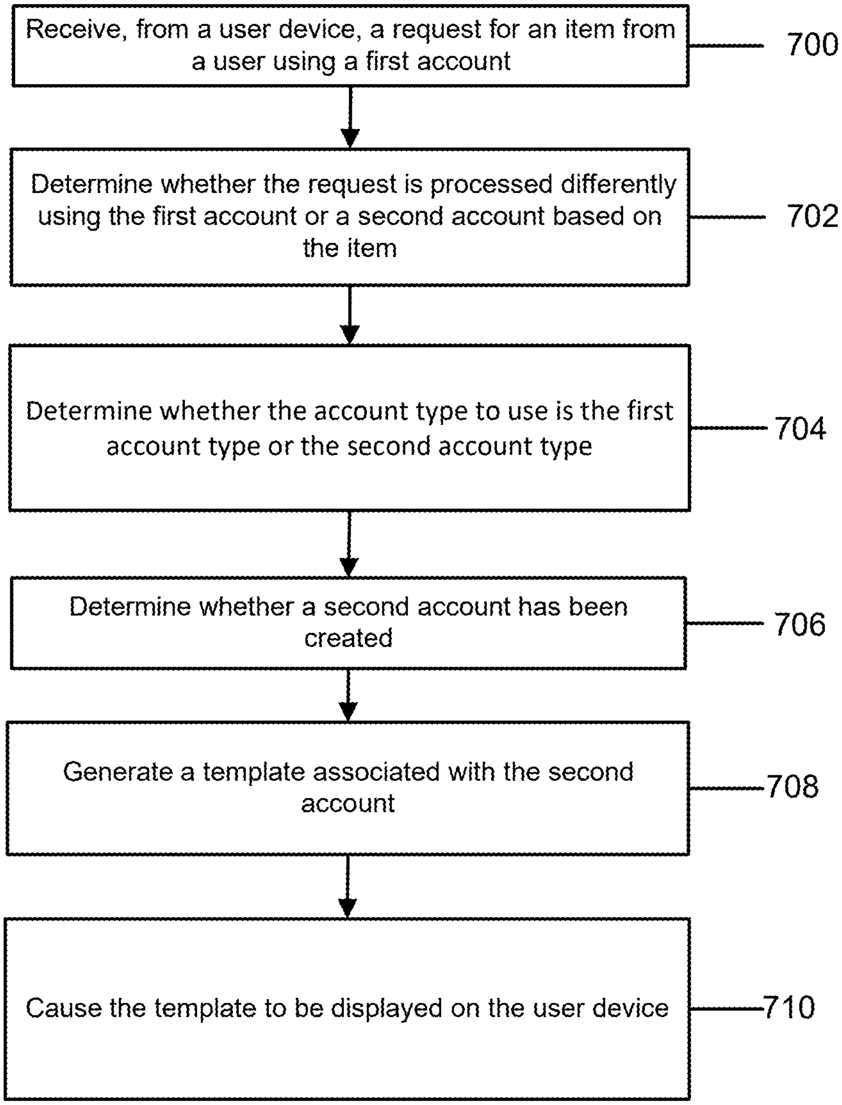
FIG. 7 is a process flow for generating a template associated with an account type, according to embodiments of the present disclosure.

FIG. 7 is a process flow for generating a template associated with an account type, according to embodiments of the present disclosure. Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 700, a computing system can receive a request for an item from a user using a first account. The user can use their user device to access a webpage via the internet. The webpage can be associated with an online platform for purchasing items and services. The user can select an item from the webpage and use an interactive element to indicate that the user wants to purchase the account. The user can further log into a first account before or after indicating that the user wants to purchase the item.

At 702, the computing system can determine whether the request is processed differently using the first account or a second account based on the item. For example, in some instances, a user using a first account (e.g., individual account) can purchase an item at a first price. The same user can purchase the same item using a second account (e.g., a commercial account) at a lesser price. However, not all items are subject to different processing if purchased using the second account. For example, the user can purchase a first item (e.g., a copy machine) using the first account, and the request for the first item may be processed differently is requested through a second account (e.g., the computing may retrieve different pricing information, retrieve different delivery information). In another example, the user can purchase a second item (e.g., a packet of socks). The computing system can use an item identifier and determine whether the item is eligible for different processing via the second account. For example, the computing system can compare the item identifier to item identifiers in a database of items that are eligible to be processed differently via the second account. In another example eligibility for different processing via the second account can be coded into the item identifier.

At 704, the computing system can determine whether the account type to use is the first account type or second account type. For example, the computing system can identify different IEs associated with the request (e.g., item type, item quantity, delivery address). The IEs can be information inputted by the user or can be metadata associated with the request. The computing system can further access historical information associated with the first account. Based on the information associated with the request and the historical information, the computing system can determine whether the account type to use is the first account type or second account type. If the computing system determines that the account type to use is the first account type, then the computing system can process the request and the process.

At 706, if the computing system determines that the account type to use is the second account type, the computing system can determine whether a second account has been created. For example, the computing system can access an identity service, which can compare the information associated with the request and the historical account information with information from second accounts to determine whether the user is already associated with a second account.

At 708, the computing system can generate a template associated with the second account. The template can be a single template or a set of templates, where each subsequent template is displayed based on an interaction between the user and a previous template. The templates can include templates that provide information about the second account. The template can include options for either switching to a pre-existing second account, creating a second account, or converting the existing first account.

At 710, the computing system can cause the template to be displayed on the user device. The template can include interactive elements the user can use to indicate the user's intentions in regard to a second account. In some instances, a response to one template can cause the computing system to cause a second template to be displayed on the user's computing system.

For example, the user uses a template to elect to either convert a first account into a second account or create a second account. In response, the computing system can cause a second template to be displayed that includes interactive elements for which information from the first account is to be imported to the second account.

In some embodiments, the template can be in the form of a bottom up sheet that is overlaid on top of an existing webpage. The bottom up sheet allows the user to either interact with the bottom up sheet or exit out of the bottom up sheet and proceed with the request as the user originally transmitted to the computing system. In other words, if the user intends to continue with the request using the first account, the user can exit out of the bottom sheet and proceed with the request.

Figure 8:
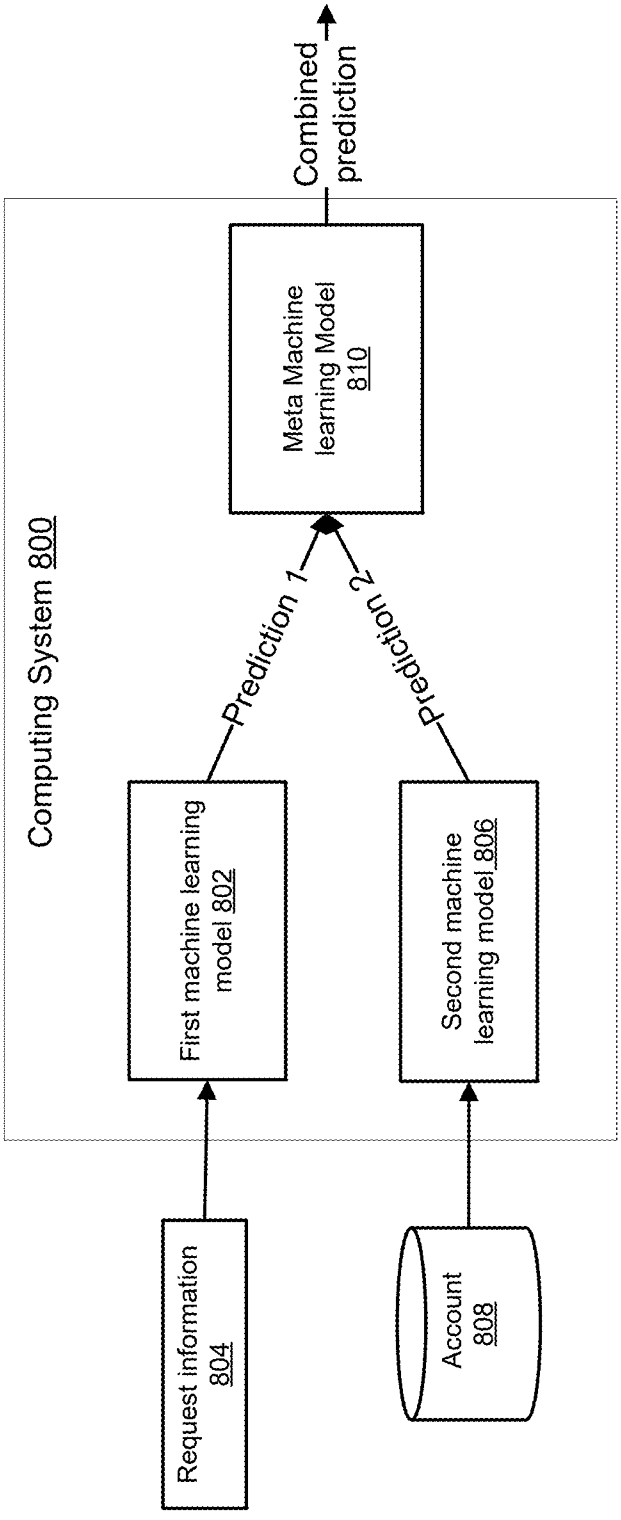
FIG. 8 illustrates an example computing system for generating a machine learning prediction as to whether the account type to use is the first account type or the second account type, according to embodiments of the present disclosure.

FIG. 8 illustrates an example computing system for generating a machine learning prediction as to the first account type or a second account type, according to embodiments of the present disclosure. A computing system 800 (e.g., computing system 100) can include a first machine learning model 802 (e.g., first machine learning model 108), implemented by a neural network, such as a CNN, ANN, or RNN.

The first machine learning model 802 can receive request information from a user device (e.g., user device 102). For example, the user can be on a webpage and select an item described on the webpage. The user can further interact with the webpage to request the item. The request information can include, for example, an item description, an item price, an item quantity, whether the delivery address is a residential address or a commercial address, whether the payment is made from an individual account or a commercial account, quantity of items requested, and other appropriate information. Based on the training, the first machine learning model 802 can make a first prediction as to whether the account type to use is the first account type or second account type.

The first machine learning model 802 can be trained on request related information to predict whether the account type to use is the first account type or second account type. A training data instance can include, for example, an item description, an item price, an item quantity, whether the delivery address is a residential address or a commercial address, whether the payment is made from an individual account or a commercial account, quantity of items requested, and other appropriate information as described above. The first machine learning model 802 can be trained using multiple training data instances, in which the information included in each training data instance varies. For example, one training data instance can include delivery addresses that is a residential address, whereas another training data instance includes a delivery address that is a commercial address The accuracy of the first machine learning model 802 can be measured against a set of validation data (e.g., ground truth data) using a loss function. Based on the loss function, the weights of the first machine learning model 802 can be iteratively adjusted until the accuracy of the model reaches a threshold accuracy. The first machine learning model 802 can further be trained to output a confidence score indicating how confident the model is in the first prediction.

The computing system 800 can also include a second machine learning model 806 (e.g., second machine learning model 110), implemented by a neural network, such as a CNN, ANN, or RNN. The second machine learning model 806 can receive historical information from an account database (e.g., account database 106). The historical information can include, for example, an item description, an item price, an item quantity, whether the number of delivery addresses is a residential address or a commercial address, whether the payment is made from an individual account or a commercial account, quantity of items requested, and other appropriate information as described above. Based on the historical information, the second machine learning model can output a second prediction as to whether the account type to use is the first account type or second account type.

The second machine learning model 806 can be trained on historical information to predict whether the account type to use is the first account type or second account type. A training data instance can include, for example, an item description, an item price, an item quantity, whether the number of delivery addresses is a residential address or a commercial address, whether the payment is made from an individual account or a commercial account, quantity of items requested, and other appropriate information as described above. The second machine learning model 806 can be trained using multiple training data instances, in which the information included in each training data instance varies. The accuracy of the second machine learning model 806 can be measured against a set of validation data (e.g., ground truth data) using a loss function. Based on the loss function, the weights of the second machine learning model 806 can be iteratively adjusted until the accuracy of the model reaches a threshold accuracy. The second machine learning model 806 can further be trained to output a confidence score indicating how confident the model is in the second prediction.

The first prediction from the first machine learning model 802 and the second prediction 806 from the second machine learning model 806 can be received by a meta machine learning model 810. The meta machine learning model can be a machine learning model (e.g., the meta machine learning model 112) by a neural network, such as a CNN, ANN, or RNN). The meta machine learning model 810 can receive predictions from multiple machine learning models and output a final prediction as to whether the account type to use is the first account type or second account type.

The meta machine learning model 810 can receive a first prediction and a first confidence score from the first machine learning model. The meta machine learning model 810 can further receive a second prediction and a second confidence score from the first machine learning model. The meta machine learning model 810 can apply a first weight to the first prediction and a second weight to the second prediction. The meta machine learning model can then generate a combined prediction as to whether the account type to use is the first account type or second account type.

The meta machine learning model 810 can be trained using multiple training data instances, in which the information included in each training data instance varies. For example, in one instance, the meta machine learning model can receive one training instance and the two predictions indicating the account to use is a second account type. The meta machine learning model can receive a second training instances, in which one prediction is that the account to use is a first account type and another prediction is a second account type. The accuracy of the meta machine learning model 810 can be measured against a set of validation data (e.g., ground truth data) using a loss function. Based on the loss function, the weights of the meta machine learning model 810 can be iteratively adjusted until the accuracy of the model reaches a threshold accuracy. The meta machine learning model 810 can further be trained to use the confidence scores generated by the first machine learning model 802 and the second machine learning model 806 to determine the final prediction. The meta machine learning model 810 can further be trained to weight the first prediction and to weight the second prediction. The meta machine learning model 810 can be trained to determine the combined prediction based on the first prediction, the second prediction, the confidence scores, and the weights.

Figure 9:
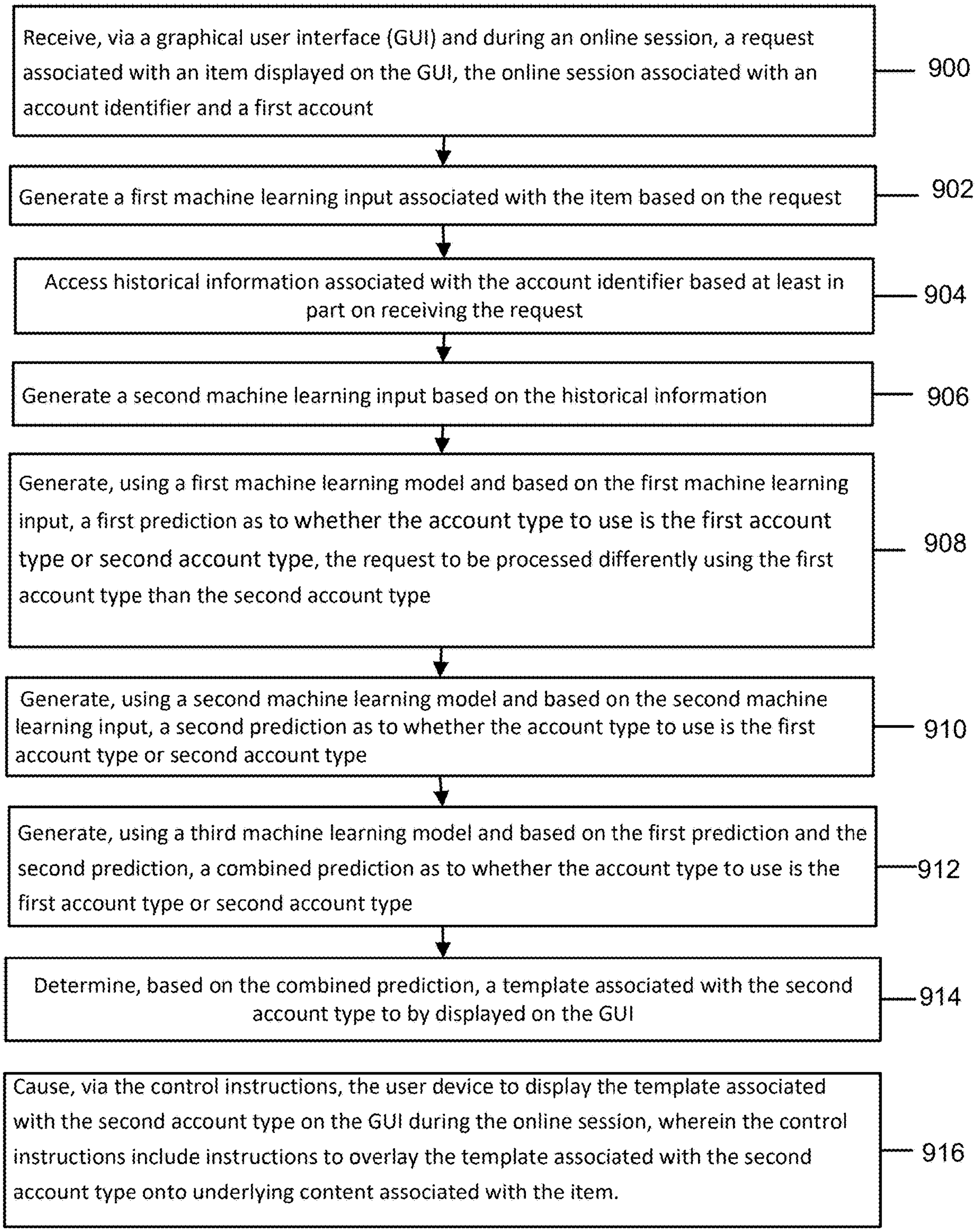
FIG. 9 is a process flow for determining whether the account type to use is the first account type or the second account type, according to embodiments of the present disclosure.

FIG. 9 is a process flow for determining whether a request is associated with a first account type or a second account type, according to embodiments of the present disclosure. At 900, a method can include a computing system receiving, via a GUI and during an online session, a request associated with an item displayed on the GUI, the online session associated with an account identifier and a first account.

At 902, the method can include the computing system generating a first machine learning input associated with the item based on the request.

At 904, the method can include the computing system accessing historical information associated with the account identifier based at least in part on receiving the request.

At 906, the method can include the computing system generating a second machine learning input based on the historical information.

At 908, the method can include the computing system generating, using a first machine learning model and based on the first machine learning input, a first prediction as to whether the account type to use is the first account type or the second account type, the request to be processed differently using the first account type than the second account type.

At 908, the method can include the computing system generating, using a second machine learning model and based on the second machine learning input, a second prediction as to whether the account type to use is the first account type or the second account type.

At 910, the method can include the computing system generating, using a third machine learning model and based on the first prediction and the second prediction, a combined prediction as to whether the account type to use is the first account type or the second account type.

At 912, the method can include the computing system determining, based on the combined prediction, a template associated with the second account type to be displayed on the GUI.

At 914, the method can include the computing system generating a message to display the template associated with the second account type on the GUI.

At 916, the method can include the computing system causing, via the message, the user device to display the template associated with the second account type on the GUI during the online session, wherein the message includes instructions to overlay the template associated with the second account type onto underlying content associated with the item.

Figure 10:
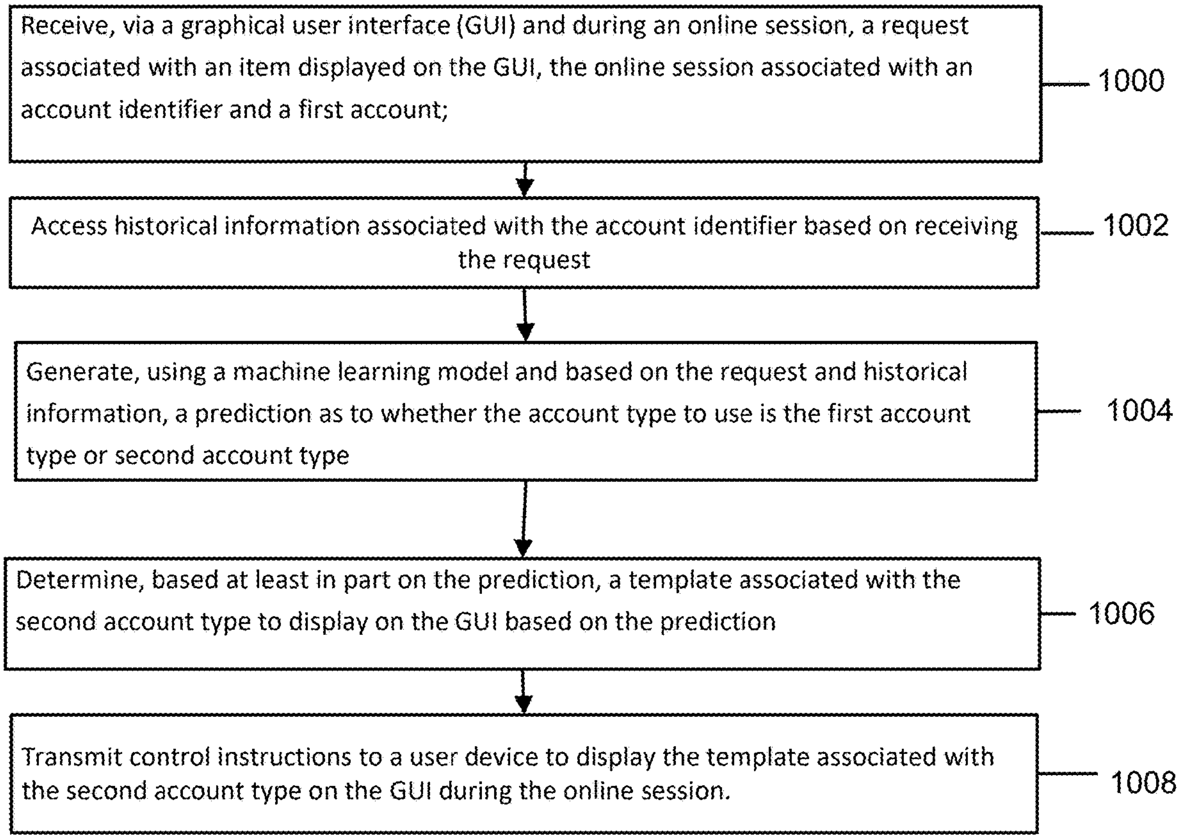
FIG. 10 is a process flow for determining whether the account type to use is the first account type or the second account type, according to embodiments of the present disclosure.

FIG. 10 is a process flow for determining whether the account type to use is the first account type or the second account type, according to embodiments of the present disclosure. At 1000, a method can include a computing system receiving, via a GUI and during an online session, a request associated with an item displayed on the GUI, the online session associated with an account identifier and a first account.

At 1002, the method can include the computing system accessing historical information associated with the account identifier based on receiving the request.

At 1004, the method can include the computing system generating, using a machine learning model and based on the request and historical information, a prediction as to whether the account type to use is the first account type or second account type;

At 1006, the method can include the computing system determining, based at least in part on the prediction, a template associated with the second account type to display on the GUI based on the prediction; and At 1008, the method can include the computing system transmitting a message to a user device to display the template associated with the second account type on the GUI during the online session.

Figure 11:
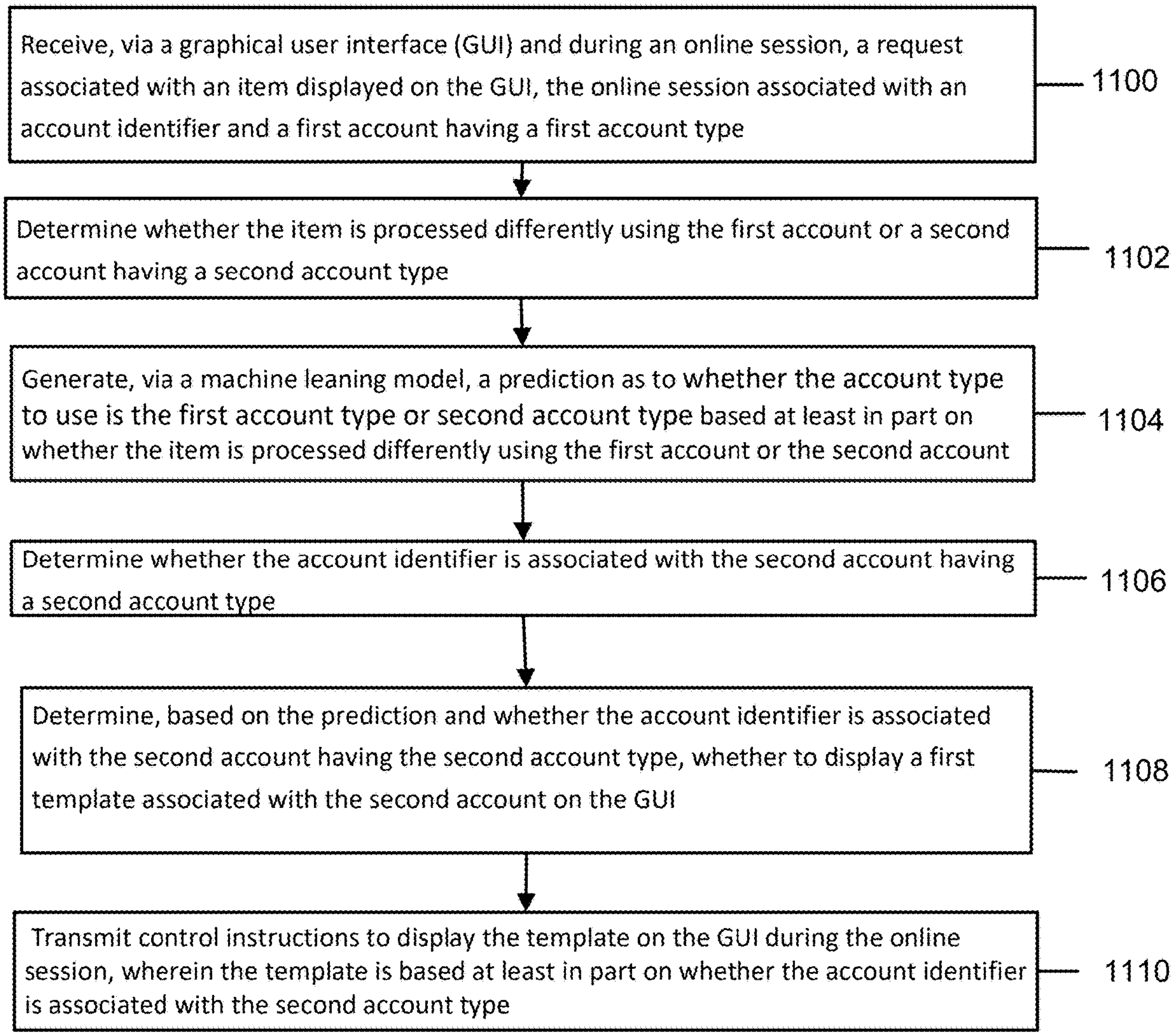
FIG. 11 is a process flow for determining whether the account type to use is the first account type or the second account type, according to embodiments of the present disclosure.

FIG. 11 is a process flow for determining whether the account type to use is the first account type or the second account type, according to embodiments of the present disclosure. At 1100, a method can include a computing system receiving, via a GUI and during an online session, a request associated with an item displayed on the GUI, the online session associated with an account identifier and a first account having a first account type.

At 1102, the method can include the computing system determining whether the item is processed differently using the first account or a second account having a second account type.

At 1104, the method can include the computing system generating, via a machine learning model, a prediction as to whether the account type to use is the first account type or second account type based at least in part on whether the item is processed differently using the first account or the second account.

At 1106, the method can include the computing system determining whether the account identifier is associated with the second account having a second account type.

At 1108, the method can include the computing system determining, based on the prediction and whether the account identifier is associated with the second account having the second account type, whether to display a first template associated with the second account on the GUI.

At 1110, the method can include the computing system transmitting a message to display the template on the GUI during the online session, wherein the template is based at least in part on whether the account identifier is associated with the second account type.

Figure 12:
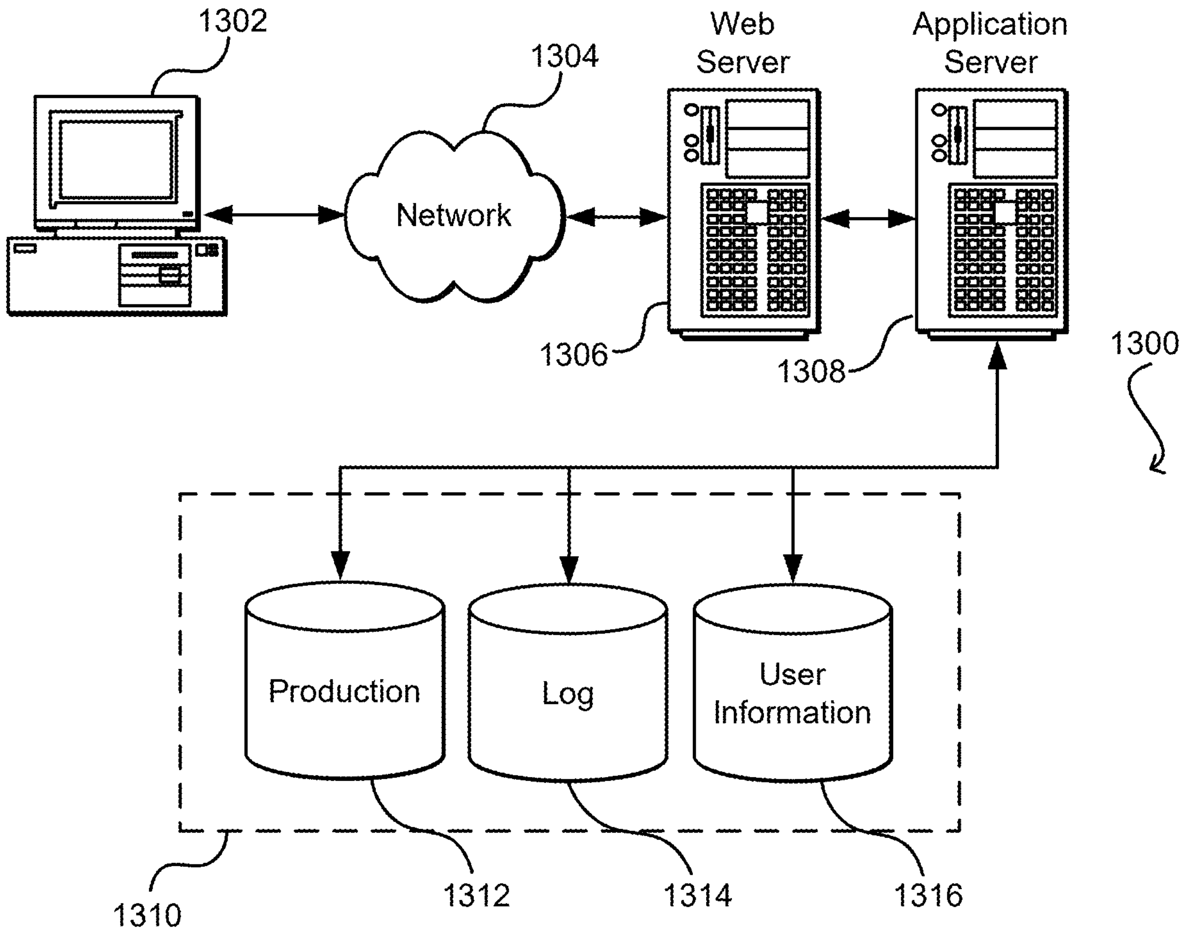
FIG. 12 illustrates aspects of an example environment for implementing aspects in accordance with various embodiments.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 1202. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 1206 or other servers over the network 1204 or other networks.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a computing system, the method comprising:

receiving, via a graphical user interface (GUI) of a user device and during an online session with the user device, a request associated with an item displayed on the GUI, the online session associated with an account identifier and a first account;

generating a first machine learning input associated with the item based at least in part on the request;

accessing historical information associated with the account identifier based at least in part on receiving the request;

generating a second machine learning input based on the historical information;

generating, using a first machine learning model and based on the first machine learning input, a first prediction as to whether an account type to use is a first account type or a second account type, the request to be processed differently using the first account type than the second account type;

generating, using a second machine learning model and based on the second machine learning input, a second prediction as to whether the account type to use is the first account type or the second account type;

generating, using a third machine learning model and based on the first prediction and the second prediction, a combined prediction that the account type to use is the second account type;

determining, based on the combined prediction, a template associated with the second account type to be displayed on the GUI;

generating a message to display the template associated with the second account type on the GUI; and causing, via the message, the user device to display the template associated with the second account type on the GUI during the online session, wherein the message includes instructions to overlay the template associated with the second account type onto underlying content associated with the item.

2. The method of claim 1 further comprising:

determining whether the account identifier is associated with a second account having the second account type, wherein the template is determined based at least in part on whether the account identifier is associated with the second account.

3. The method of claim 2, wherein the account identifier is determined to not be associated with the second account, and wherein the method further comprises:

generating a temporary second account based on the account identifier being determined to not be associated with the second account type, wherein the template includes an interactive element for indicating whether to create the second account.

4. The method of claim 2, the method further comprises:

receiving, via the template presented in the GUI, an input, via the template, indicating to create the second account;

creating the second account based at least in part on the input;

associating the second account with the account identifier; and processing the request using the second account during the online session.

5. A computing system comprising:

one or more processors; and one or more non-transitory, computer-readable media including instructions that, when executed by the one or more processors, cause the one or more processors to:

receive, via a graphical user interface (GUI) of a user device and during an online session, a request associated with an item displayed on the GUI of the user device, the online session associated with an account identifier and a first account;

access historical information associated with the account identifier based on receiving the request;

generate, using a machine learning model and based on the request and historical information, a prediction as to whether an account type to use is a first account type or a second account type;

determine, based at least in part on the prediction, a template associated with the second account type to display on the GUI based on the prediction; and transmit a message to the user device to display the template associated with the second account type on the GUI during the online session.

6. The computing system of claim 5, wherein the request comprises location address for delivery of the item, delivery time information, and financial information for purchase of the item, and wherein the instructions that, when executed by the one or more processors, cause the one or more processors to:

generate a first machine learning input based at least in part on one of:

determining whether the location address for the delivery of the item corresponds to a residential address or a commercial address;

determining whether the delivery time information corresponds to a non-residential delivery time or a commercial delivery time; and determining whether the financial information corresponds to an individual financial account or a commercial financial account.

7. The computing system of claim 6, wherein the historical information comprises a frequency of purchase of the item over a first time interval and using the first account, a second frequency of purchase of all items, including the item, over a second time interval and using the first account, and delivery information for all items, including the item, over a third time interval and using the first account, and wherein the instructions that, when executed by the one or more processors, cause the one or more processors to:

generate a second machine learning input based at least in part on one of:

determining whether the frequency of purchase of the item over the first time interval and using the first account exceeds a first threshold;

determining whether the second frequency of purchase of all items, including the item, over the second time interval and using the first account type exceeds a second threshold; and determining whether the delivery information for all items, including the item, over the third time interval and using the first account exceeds a third threshold.

8. The computing system of claim 5, wherein the instructions that, when executed by the one or more processors, further cause the one or more processors to:

access a second prediction as to whether the account type to use is the first account type or the second account type generated during a previous online session associated with the first account, wherein the historical information comprises the second prediction generated during the previous online session.

9. The computing system of claim 5, wherein the instructions that, when executed by the one or more processors, further cause the one or more processors to:

generate, using a first machine learning model and based on the first machine learning input, a first prediction as to whether the account type to use is the first account type or the second account type, wherein the request is processed differently for the first account type than the second account type;

generate, using a second machine learning model, a second prediction as to whether the account type to use is the first account type or the second account type; and generate, using an ensemble model, a combined prediction as to whether the account type to use is the first account type or the second account type based on the first prediction and the second prediction, wherein the prediction comprises the combined prediction.

10. The computing system of claim 5, wherein the instructions that, when executed by the one or more processors, further cause the one or more processors to:

provide the account identifier to an identity service; and receive from the identity service an indication as to whether the account identifier is associated with the first account or a second account, wherein the template is displayed based at least in part on the whether the account identifier is associated with the first account or the second account.

11. The computing system of claim 5, wherein the instructions that, when executed by the one or more processors, further cause the one or more processors to:

provide the account identifier to an identity service;

receive an indication as to whether the account identifier is associated with a valid first account; and determine whether to display the template based at least in part on whether the account identifier is associated with the valid first account.

12. The computing system of claim 5, wherein the message comprises first control instructions to generate the template to be overlaid on an underlaying webpage displayed via the GUI, the template comprising an interactive element to convert the first account into a second account, and wherein the instructions that, when executed by the one or more processors, further cause the one or more processors to:

receive, via the template a user input to convert the first account into the second account;

convert the first account into the second account based at least in part on the user input; and process the request using the second account during the online session.

13. The computing system of claim 5, wherein the message comprises first control instructions to generate the template to be overlaid on an underlaying webpage displayed via the GUI, the template comprising an interactive element to create a second account, and wherein the instructions that, when executed by the one or more processors, further cause the one or more processors to:

receive, via the template a user input to create the second account;

create the second account based at least in part on the user input; and process the request using the second account during the online session.

14. The computing system of claim 13, wherein the instructions that, when executed by the one or more processors, further cause the one or more processors to:

generate a temporary second account type, wherein the template includes a second interactive element for indicating whether to auto-populate the temporary second account type using information from the first account type; and receive, via the template, a second user input indicating to auto-populate the temporary second account type, wherein the second account is created based at least in part on auto-populating the temporary second account type.

15. One or more non-transitory, computer-readable media storing a sequence of instructions that, when executed by one or more processors, cause the one or more processors to:

receive, via a graphical user interface (GUI) and during an online session, a request associated with an item displayed on the GUI, the online session associated with an account identifier and a first account having a first account type;

determine whether the item is processed differently using the first account or a second account having a second account type;

generate, via a machine learning model, a prediction as to whether an account type to use is the first account type or second account type based at least in part on whether the item is processed differently using the first account or the second account;

determine whether the account identifier is associated with the second account having the second account type;

determine, based on the prediction and whether the account identifier is associated with the second account having the second account type, whether the account type to use is the first account type or the second account type; and transmit a message to display a first template on the GUI during the online session, wherein the first template is based at least in part on whether the account identifier is associated with the second account type.

16. The one or more non-transitory computer-readable media of claim 15, wherein the account identifier is not associated with the second account type, and wherein the instructions that, when executed by the one or more processors, further cause the one or more processors to:

generate a temporary second account type;

access a plurality of templates;

access the first template from the plurality of templates based on the account identifier not being associated with the second account, wherein the first template includes a first interactive element for indicating whether to create the second account;

transmit the message to display the first template on the GUI;

receive a first input, via the GUI, comprising an indication to create the second account; and create a temporary second account based at least in part on the first input.

17. The one or more non-transitory computer-readable media of claim 16, wherein the instructions that, when executed by the one or more processors, further cause the one or more processors to:

access a second template from the plurality of templates based at least in part on the first input, wherein the second template includes a second interactive element for indicating whether to auto-populate the temporary second account using information from the first account;

receive a second input indicating to auto-populate the temporary second account using information from the first account; and create the second account based at least in part on auto-populating the temporary second account using information from the first account.

18. The one or more non-transitory computer-readable media of claim 15, wherein the account identifier is associated with the second account type, and wherein the instructions that, when executed by the one or more processors, causes the one or more processors to:

access the first template from the plurality of templates based on the account identifier being associated with the second account, wherein the template includes interactive element for indicating whether to switch to the second account;

receive a first input indicating to switch the second account; and process the request using the second account during the online session.

19. The one or more non-transitory computer-readable media of claim 15, wherein the account identifier is associated with the second account type, and wherein the instructions that, when executed by the one or more processors, cause the one or more processors to:

access the first template from the plurality of templates based on the account identifier being associated with the second account, wherein the first template includes an interactive element for indicating whether to switch to the second account;

receive a first input indicating a user exited from the first template;

receive a second input indicating to process the request using the first account;

and process the request using the first account during the online session.

20. The one or more non-transitory computer-readable media of claim 15, wherein the account identifier is associated with the second account type, and wherein the instructions that, when executed by the one or more processors, cause the one or more processors to:

access the first template from the plurality of templates based on the account identifier not being associated with the second account, wherein the first template includes interactive element for indicating whether to convert the first account into the second account;

receive a first input indicating to convert the first account into the second account;

convert the first account to the second account; and process the request using the second account during the online session.

* * * * *